(12) United States Patent
Twede

(10) Patent No.: US 10,789,467 B1
(45) Date of Patent: Sep. 29, 2020

(54) POLARIZATION-BASED DISTURBED EARTH IDENTIFICATION

(71) Applicant: Lockheed Martin Corporation, Bethesda, MD (US)

(72) Inventor: David R. Twede, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 65 days.

(21) Appl. No.: 16/107,435

(22) Filed: Aug. 21, 2018

Related U.S. Application Data

(60) Provisional application No. 62/678,008, filed on May 30, 2018.

(51) Int. Cl.
| | |
|---|---|
| *G06T 7/00* | (2017.01) |
| *G06K 9/00* | (2006.01) |
| *G01J 4/00* | (2006.01) |
| *G01V 8/20* | (2006.01) |
| *G06K 9/62* | (2006.01) |
| *G06K 9/20* | (2006.01) |

(52) U.S. Cl.
CPC .......... *G06K 9/00624* (2013.01); *G01J 4/00* (2013.01); *G01V 8/20* (2013.01); *G06K 9/2018* (2013.01); *G06K 9/6267* (2013.01); *G01J 2004/002* (2013.01); *G06K 2209/09* (2013.01)

(58) Field of Classification Search
CPC ....... E21B 47/00; E21B 49/088; G01N 21/49; B42D 25/391; B42D 25/324; B42D 25/328; B42D 25/373; B42D 25/29
USPC .......................... 382/109; 356/367, 369, 364
See application file for complete search history.

(56) References Cited

U.S. PATENT DOCUMENTS

| | | | |
|---|---|---|---|
| 4,790,654 | A | 12/1988 | Clarke |
| 5,575,438 | A | 11/1996 | McGonigle et al. |
| 6,009,340 | A | 12/1999 | Hsia |
| 6,765,617 | B1 | 7/2004 | Tangen et al. |

(Continued)

FOREIGN PATENT DOCUMENTS

JP          2009218237 A         9/2009

OTHER PUBLICATIONS

Non-Final Office Action for U.S. Appl. No. 15/410,463, dated Aug. 6, 2019, 19 pages.

(Continued)

*Primary Examiner* — Phuoc H Doan
(74) *Attorney, Agent, or Firm* — Withrow & Terranova, PLLC

(57) ABSTRACT

The embodiments implement polarization-based disturbed earth identification. At least one sensor apparatus comprising a plurality of detector elements receives polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation. The sensor apparatus outputs sensor information that quantifies EMR received by each detector element of the plurality of detector elements. A computing device processes the sensor information to generate an image or a classification image of the scene based on an amount of polarized EMR received by each detector element, and presents the image on a display device.

21 Claims, 13 Drawing Sheets
(4 of 13 Drawing Sheet(s) Filed in Color)

(56) References Cited

U.S. PATENT DOCUMENTS

| | | | |
|---|---|---|---|
| 7,447,335 | B1 | 11/2008 | Quintana et al. |
| 7,718,968 | B1 | 5/2010 | Murguia |
| 8,760,494 | B1 | 6/2014 | Twede |
| 2002/0017612 | A1 | 2/2002 | Yu et al. |
| 2004/0135881 | A1 | 7/2004 | Jones et al. |
| 2005/0098713 | A1 | 5/2005 | Holland |
| 2005/0262995 | A1 | 12/2005 | Kilkis |
| 2006/0066738 | A1 | 3/2006 | Hershey et al. |
| 2007/0177071 | A1 | 8/2007 | Egi et al. |
| 2007/0200977 | A1 | 8/2007 | Egi et al. |
| 2008/0094609 | A1 | 4/2008 | Ragucci et al. |
| 2009/0201487 | A1 | 8/2009 | Paluszek et al. |
| 2010/0145416 | A1 | 6/2010 | Kang et al. |
| 2010/0157298 | A1* | 6/2010 | Hayter ............ G01J 4/04 356/367 |
| 2010/0284073 | A1 | 11/2010 | Iler et al. |
| 2011/0089323 | A1 | 4/2011 | Treado et al. |
| 2011/0242328 | A1 | 10/2011 | Twede et al. |
| 2012/0119089 | A1 | 5/2012 | Sanchez del Rio Saez et al. |
| 2012/0138514 | A1 | 6/2012 | Janssens et al. |
| 2014/0362331 | A1 | 12/2014 | Shi et al. |
| 2015/0138534 | A1 | 5/2015 | Tidhar |
| 2016/0037089 | A1 | 2/2016 | Silny et al. |
| 2016/0124250 | A1 | 5/2016 | Schonbrun et al. |
| 2018/0100799 | A1* | 4/2018 | Price ............ G01N 21/49 |
| 2018/0203246 | A1 | 7/2018 | Twede |

OTHER PUBLICATIONS

International Preliminary Report on Patentability for International Patent Application No. PCT/US2018/014413, dated Aug. 1, 2019, 6 pages.
Non-Final Office Action for U.S. Appl. No. 13/080,419 dated May 3, 2013, 9 pages.
Final Office Action and Applicant-Initiated Interview Summary for U.S. Appl. No. 13/080,419 dated Aug. 12, 2013, 13 pages.
Advisory Action for U.S. Appl. No. 13/080,419 dated Dec. 4, 2013, 3 pages.
Non-Final Office Action for U.S. Appl. No. 13/100,772 dated Mar. 15, 2013, 21 pages.
Final Office Action for U.S. Appl. No. 13/100,772 dated Sep. 16, 2013, 27 pages.
Notice of Allowance for U.S. Appl. No. 13/100,772 dated Feb. 13, 2014, 11 pages.
Gritz, David N., "Near-Infrared (IR) Polarizing Glass," Proceedings of SPIE 750, Infrared Systems and Components, Sep. 10, 1987, SPIE, 3 pages.
Hecht, Eugene, "Chapter 8: Polarization," Optics (book), Second Edition, 1990, Addison-Wesley, pp. 270-326.
Preston et al., "Development of a Field-Portable Multispectral Imaging and Classification System," ASPRS/ACSM Annual Convention and Exposition, Apr. 25-28, 1994, vol. 2, pp. 156-167.
Stolper et al., The Design and Evaluation of a Multi-Spectral Imaging Camera for the Inspection of Transmission Lines and Substation Equipment, Eksom, South Africa, 14 pages.
Stookey, S. D. et al., "Selective Polarization of Light Due to Absorption by Small Elongated Silver Particles in Glass," Applied Optics, vol. 7, Issue 5, May 1968, The Optical Society, pp. 777-779.
Yu, X. J. et al., "Optical wire-grid polarizers at oblique angles of incidence," Journal of Applied Physics, vol. 93, Issue 8, Apr. 15, 2003, American Institute of Physics, pp. 4407-4412.
Kenton, A. C., et al., "Detection of Land Mines with Hyperspectral Data," Proceedings of the SPIE Conference on Detection and Remediation Technologies for Mines and Minelike Targets IV, Apr. 2, 1999, Orlando, Florida, USA, pp. 917-928.
International Search Report and Written Opinion for International Patent Application No. PCT/US2018/014413, dated Jun. 21, 2018, 9 pages.
Final Office Action for U.S. Appl. No. 15/410,463, dated Jan. 2, 2020, 22 pages.
Non-Final Office Action for U.S. Appl. No. 15/410,463, dated Jun. 11, 2020, 13 pages.

* cited by examiner

POLARIZATION-BASED DISTURBED EARTH IDENTIFICATION

RELATED APPLICATIONS

This application claims the benefit of U.S. Provisional Application No. 62/678,008, filed on May 30, 2018, entitled "POLARIZATION-BASED DISTURBED EARTH IDENTIFICATION," the disclosure of which is hereby incorporated herein by reference in its entirety.

TECHNICAL FIELD

The embodiments relate generally to identifying an area of disturbed earth and, in particular, to polarization-based disturbed earth identification.

BACKGROUND

It may be desirable to identify portions of the surface of the earth that have been disturbed relatively recently. This may be particularly helpful, for example, where it is desirable to find items that were recently placed under the surface of the earth. One specific example relates to determining whether hazardous materials, such as improvised explosive devices (IEDs), have been placed under the surface of the earth. Detection of disturbed earth typically involves spectral analysis with an emphasis on spectral bands in the visible-near infrared and in the long-wave infrared, but may also include bands in the short-wave and mid-wave infrared. Disturbed earth is highly varying with several factors: local geology, mineralogy, water content, weathering, roadway use/wear-and-tear, etc. While spectroscopy may work sufficiently well when underlying soil layers, brought to the surface, differ in mineral or organic makeup from that of the adjacent earth, spectroscopy tends to perform poorly when the underlying layers of the earth have the same mineral composition as that of the adjacent earth, and the main difference lies in the mineral granule size distributions between the top undisturbed and the lower disturbed layers. In such situations, spectral analysis alone may not detect an area of disturbed earth.

SUMMARY

The embodiments implement polarization-based disturbed earth identification. The embodiments utilize electromagnetic radiation (EMR) that has been reflected or emitted from a scene within certain wavebands and that have certain polarization orientations to distinguish between disturbed earth and non-disturbed earth.

In one embodiment, a method is disclosed. The method includes receiving, by at least one sensor apparatus comprising a plurality of detector elements, polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation. The method further includes outputting, by the at least one sensor apparatus, sensor information that quantifies EMR received by each detector element of the plurality of detector elements. The method further includes processing, by a computing device, the sensor information to generate processed sensor information based at least in part on an amount of polarized EMR received by at least some of the detector elements. The method further includes presenting, on a display device, an image that is based on the processed sensor information.

In another embodiment, a system is disclosed. The system includes at least one sensor apparatus that is configured to receive, by the at least one sensor apparatus, polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation. The at least one sensor apparatus is further configured to output sensor information that quantifies EMR received by each detector element of the plurality of detector elements. The system includes a processor device communicatively coupled to the at least one sensor apparatus. The processor device is configured to process the sensor information to generate processed sensor information based at least in part on an amount of polarized EMR received by at least some of the detector elements, and present, on a display device, an image that is based on the processed sensor information.

Those skilled in the art will appreciate the scope of the disclosure and realize additional aspects thereof after reading the following detailed description of the preferred embodiments in association with the accompanying drawing figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawing figures incorporated in and forming a part of this specification illustrate several aspects of the disclosure and, together with the description, serve to explain the principles of the disclosure.

DETAILED DESCRIPTION

Figure 1:
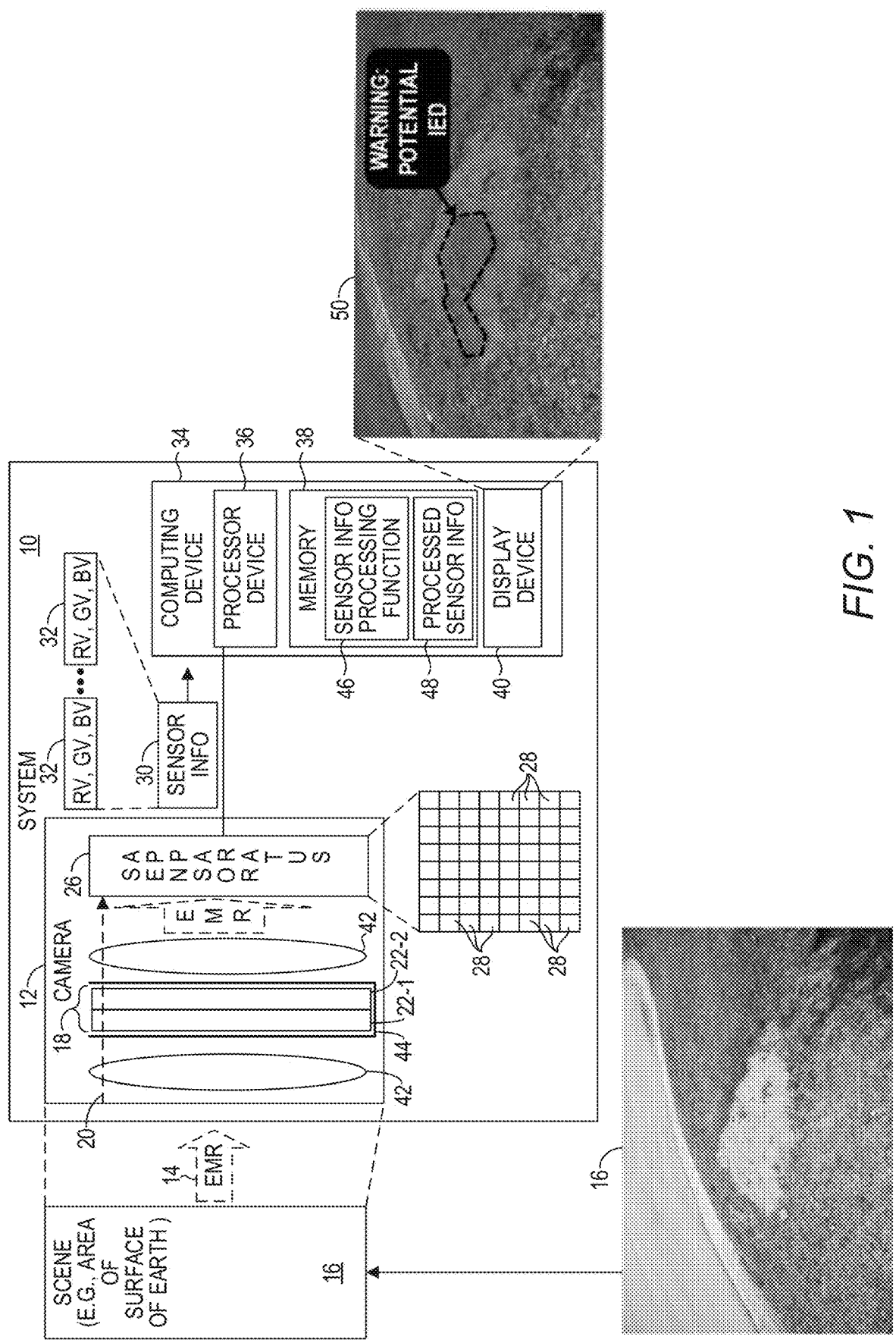
FIG. 1 is a block diagram of a system according to one embodiment.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first polarizing filter" and "second polarizing filter," and does not imply a priority, a type, an importance, or other attribute, unless otherwise stated herein. The term "about" used herein in conjunction with a numeric value means any value that is within a range of ten percent greater than or ten percent less than the numeric value.

The phrase "earth" as used herein refers to the earth as well as any celestial body having a surface that comprises soil and may also identify sub-areas of the celestial body including areas of the surface and areas with surface soil and/or soil at depth. The phrase "unpolarized EMR" as used herein refers to electromagnetic radiation (EMR) that contains photons with a random distribution of polarization orientations (i.e., random distribution of electric field orientations). Examples of unpolarized EMR include EMR generated by the sun, flames, and incandescent lamps. "Polarized EMR" refers to a plurality of EMR rays (i.e., photons) that has the same polarization orientation, whether linear or circular. Partially polarized EMR refers to EMR that has an unpolarized EMR component and a polarized EMR component.

It may be desirable to identify portions of the surface of the earth that have been disturbed relatively recently. This may be particularly helpful, for example, where it is desirable to find items that were recently placed under the surface of the earth. One specific example relates to determining whether hazardous materials, such as improvised explosive devices (IEDs), have been placed under the surface of the earth. Detection of disturbed earth typically involves spectral analysis with an emphasis on spectral bands in the visible-near infrared and in the long-wave infrared. Disturbed earth is highly varying with several factors: local geology, mineralogy, water content, weathering, roadway use/wear-and-tear, etc. While spectroscopy may work sufficiently well when underlying soil layers, brought to surface, differ in mineral or organic makeup from that of the adjacent earth, spectroscopy tends to perform poorly when the underlying layers of the earth have the same mineral composition as that of the adjacent earth, and the main difference lies in the mineral granule size distributions between the top undisturbed and the lower disturbed layers. In such situations, spectral analysis alone may not detect an area of disturbed earth.

Typically, when the mineral composition of disturbed and undisturbed areas of the earth is chemically similar, the largest differentiation is in the particle size distributions. For most mineral types (not inclusive of organic soils or sands) the disturbed soil has a larger variance in size distribution (i.e., 20-100 μm diameters for iron-rich fine sands) than the undisturbed soil (i.e., 10-30 μm diameters). Aging from rainwater, wind, vehicle traffic and other factors tend to compress the distribution of the soil into a "smoother," less varied size set of particles through soaking (rain), redistributing finer particles on the top layer (wind) or compressing particles into smooth surfaces (vehicles). The smaller, smoother distribution provides a narrow set of reflected polarization angles with a relatively high degree of polarizability (i.e., specular reflection lobes). One may think of these undisturbed regions as more reflective of forward light (i.e., the sun forward of the observer) and having less back-scatter (due to a smoother, more reflective surface). The larger distribution of particle sizes found in disturbed areas will generally have a wider set of polarization-scatter angles with a relatively lower degree of polarizability (i.e., "rough surface" diffuse reflection). In this sense, the disturbed regions will have more back-scatter reflection and less forward scattered light than the undisturbed areas. "Smoothness" refers to the relative distributed sizes of particles compared with the wavelengths used to analyze the EMR reflected or emitted from the surfaces. Thus, a similar situation applies to EMR that is emitted from surfaces (i.e., thermal emissions from soil). Generally, the smoother the surface, the more polarized the emissions from the surface. The "rougher" the surface, the more unpolarized the emissions from the surface.

FIG. 1 is a block diagram of a system 10 according to one embodiment. The system 10 includes a camera 12 that receives EMR 14 from a scene 16 of an area of a surface of the earth. The EMR 14 may comprise EMR in any waveband, including, by way of non-limiting example, long-wave infrared wavebands, mid-wave infrared wavebands, short-wave infrared wavebands, a near-ultraviolet waveband in the ultraviolet light spectrum ranging from about 300 nanometers (nm) to about 400 nm, a visible waveband in a visible light spectrum ranging from about 400 nm to about 700 nm, and a near-infrared (NIR) waveband in an infrared spectrum ranging from about 700 nm to about 1400 nm. The phrase "waveband" includes a range of wavelengths within the relevant spectrum, such as long-, mid-, and short-wave infrared spectrums, within the visible light spectrum, the ultraviolet light spectrum, or the NIR spectrum. Moreover, because soil particle sizes can vary greatly from about 1 micron (e.g., "moondust") to as large as 1 millimeter (large sand granules), the wavelengths useful for discriminating soils can vary greatly as well, in some embodiments from about 100 nanometers to about 100 microns in wavelength.

The system 10 includes a filter assembly 18 that is positioned in the camera 12 in an optical path 20 along which the EMR 14 travels. In one embodiment, the filter assembly 18 includes a first polarizing filter 22-1 positioned in the optical path 20 that is configured to receive the EMR 14 from the scene 16 and to pass a first subset of EMR 14 comprising EMR 14 in a first waveband that has a first polarization orientation and EMR 14 in one or more second wavebands irrespective of polarization orientation. The first polarizing filter 22-1 blocks the EMR 14 in the first waveband that does not have the first polarization orientation. The first polarizing filter 22-1 may also pass the EMR 14 in a number of other wavebands irrespective of polarization orientation. As an example, the first polarizing filter 22-1 may pass a red waveband comprising the EMR 14 having wavelengths in a range between about 550 nm and 750 nm (referred to herein as "red EMR 14" for the sake of brevity) that has a particular polarization orientation, such as a vertical polarization orientation, and block red EMR 14 that has any other polarization orientation. The first polarizing filter 22-1 may pass all other EMR 14 having wavelengths in a range between about 300 nm and 500 nm irrespective of polarization orientation and EMR 14 having wavelengths in a range between about 800 nm and 1000 nm (or greater) irrespective of polarization orientation. In some embodiments the polarizing filters discussed herein may comprise, by way of non-limiting example, an absorptive-based polarizer using wire-grids, polarizing beam-splitters, birefringent optical materials, and the like.

The filter assembly 18 includes a second polarizing filter 22-2 positioned in the optical path 20 downstream of the first polarizing filter 22-1. The second polarizing filter 22-2 is configured to receive the first subset of the EMR 14 from the first polarizing filter 22-1 and to pass a second subset of the EMR 14 including the EMR 14 in the second waveband that has a second polarization orientation and the EMR 14 in the first waveband that has the first polarization orientation. The second polarizing filter 22-2 blocks the EMR 14 in the second waveband that does not have the second polarization orientation.

As an example, the second polarizing filter 22-2 may pass a blue waveband comprising the EMR 14 having wavelengths in a range between about 300 nm and 500 nm (referred to herein as "blue EMR 14" for the sake of brevity) that has a particular polarization orientation, such as a horizontal polarization orientation, and block blue EMR 14 that has any other polarization orientation. The first polarizing filter 22-2 may pass all other EMR 14 having wavelengths in a range between about 500 nm and 1000 nm (or greater) irrespective of polarization orientation (including the vertically polarized red EMR 14 passed by the first polarizing filter 22-1).

The first polarizing filter 22-1 and the second polarizing filter 22-2 may be referred to generally herein singularly as "polarizing filter 22" or in the plural as "polarizing filters 22." The phrase "pass" as used herein in conjunction with the polarizing filter 22 refers to the transmission by the polarizing filter 22 of the EMR 14 that has passed through the polarizing filter 22, and does not imply active electronics that actively transmit the EMR 14.

The second subset of the EMR 14 thus, in this example, comprises horizontally polarized blue EMR 14, vertically polarized red EMR 14, and includes other wavebands of any polarization orientation. The second subset of the EMR 14 may pass through one or more lens arrangements 24 and then impinge upon a sensor apparatus 26 in the camera 12. The sensor apparatus 26 comprises a plurality of detector elements 28 (typically arranged in a matrix structure) sensitive to the EMR 14 in all desired wavebands, including the EMR 14 in the first waveband and the EMR 14 in the second waveband, which, in this example, are in the visible wavebands of blue EMR 14 and red EMR 14. Thus, in the example of the EMR 14 in the visible light spectrum, the sensor apparatus 26 may comprise, for example, a complimentary metal-oxide semiconductor (CMOS) or a charge-coupled device (CCD) sensor device. In other embodiments, such as embodiments that operate in the infrared (IR) wavebands, the sensor apparatus 26 may comprise either a CMOS or CCD sensor, or a focal plane array (FPA), depending on the particular IR wavebands of interest. The sensor apparatus 26 is also configured to spectrally distinguish the EMR 14 in the first waveband from the EMR 14 in the second waveband. For example, the sensor apparatus 26 may include, or may be downstream of, a color filter array such as a Bayer filter mosaic, or other color separating mechanisms, such as spectral dispersive elements (e.g., gratings, prisms, and the like), notch filters, bandpass filters, and the like. The sensor apparatus 26 may have any desired resolution of detector elements 28, such as a 1024×1024 grid of 1,048,576 detector elements 28.

The sensor apparatus 26 generates sensor information 30 that characterizes the EMR 14 impinging on the detector elements. In particular, in some embodiments, the sensor information 30 comprises detector element information 32 for each detector element 28 that quantifies the amount of EMR received by each respective detector element 28. The detector element information 32 may include a red value (RV) that quantifies an intensity of red EMR that impinged upon a respective detector element 28, a green value (GV) that quantifies an intensity of green EMR that impinged upon the respective detector element 28, and a blue value (BV) that quantifies an intensity of blue EMR that impinged upon the respective detector element 28. Collectively, the green values contained in the detector element information 32 is sometimes referred to as the "green channel," the red values contained in the detector element information 32 is sometimes referred to as the "red channel," and the blue values contained in the detector element information 32 is sometimes referred to as the "blue channel."

The system 10 includes a computing device 34 that has a processor device 36 coupled to a memory 38 and a display device 40. The computing device 34 may have additional components, such as a storage device, and other hardware elements of a computing device that are not shown for purposes of simplicity. While the computing device 34 may be external to the camera 12, in other embodiments the computing device 34 may be integrated into the camera 12.

The system 10 may also include an objective lens 42 positioned in the camera 12 to receive the EMR 14 from the scene 16. The EMR 14 may travel downstream along the optical path 20 to the filter assembly 18. Note that the filter assembly 18 may be placed at any location along the optical path 20, including at a pupil plane or an image plane. In some embodiments, a number of different filter assemblies 18 may exist, depending on an expected type of soil, and the filter assemblies 18 may be constructed with a frame that can be detachably inserted into a transparent holder 44. In this manner, a particular filter assembly 18 that operates in two (or more) desired wavebands with desired polarization orientations may be inserted into the transparent holder 44, depending on the particular composition of the soil in the scene 16.

In some embodiments, the first polarizing filter 22-1 is fixed with respect to the second polarizing filter 22-2. In some embodiments, the first polarizing filter 22-1 may be coupled directly to the second polarizing filter 22-2 via an adhesive, an optical coating, or the like. In other embodiments, the first polarizing filter 22-1 may be movable with respect to the second polarizing filter 22-2. In some embodiments, the polarization orientation of the first polarizing filter 22-1 may be movable with respect to the polarization orientation of the second polarizing filter 22-2. For example, the polarization orientation of the first polarizing filter 22-1 may be movable between a range of 20 degrees to 90 degrees with respect to the polarization orientation of the second polarizing filter 22-2, or within any other desired range. The first polarizing filter 22-1 and the second polarizing filter 22-2 may be sourced from any of a number of optics providers and manufacturers, such as CODIXX AG located at Steinfeldstrabe 3, 39179 Barleben, Germany; Edmund Optics Inc., located at 101 East Gloucester Pike, Barrington, N.J. 08007-1380; Deposition Sciences, Inc., located at 3300 Coffey Lane, Santa Rosa Calif. 95403; or MOXTEK, Inc., located at 452 W 1260 N, Orem, Utah 84057.

While for purposes of illustration the polarization orientations are discussed herein as being linear, the embodiments are not limited to linear polarization orientations, and have applicability to circular and elliptical polarization orientations as well. Thus, the first polarization orientation may be a right-hand circular polarization orientation and the second polarization orientation may be a left-hand circular polarization orientation.

While the embodiments may utilize a number of different wavebands, in some additional embodiments, the first polarizing filter 22-1 may pass a blue waveband comprising the EMR 14 having wavelengths in a range between about 370 nm and 570 nm (referred to herein as "the first EMR 14" for the sake of brevity) that has a particular polarization orientation, such as a vertical polarization orientation, and block the first EMR 14 that has any other polarization orientation. The first polarizing filter 22-1 may pass all other EMR 14 having wavelengths in a range between about 600 nm and 1000 nm irrespective of polarization orientation. The second polarizing filter 22-2 may pass a waveband comprising the EMR 14 having wavelengths in a range between about 650 nm and 1000 nm (referred to herein as "the second EMR 14" for the sake of brevity) that has a particular polarization orientation, such as a horizontal polarization orientation, and block the second EMR 14 that has any other polarization orientation. The second polarizing filter 22-2 may pass all other EMR 14 having wavelengths in a range between about 300 nm and 600 nm and between about 900 nm and 1000 nm irrespective of polarization orientation.

In yet another embodiment, the first polarizing filter 22-1 may pass a waveband comprising the EMR 14 having wavelengths in a range between about 550 nm and 750 nm (referred to herein as "the first EMR 14" for the sake of brevity) that has a particular polarization orientation, such as a vertical polarization orientation, and block the first EMR 14 that has any other polarization orientation. The first polarizing filter 22-1 may pass all other EMR 14 having wavelengths in a range between about 300 nm and 500 nm and between about 800 nm and 1000 nm irrespective of polarization orientation. The second polarizing filter 22-2 may pass a waveband comprising the EMR 14 having wavelengths in a range between about 370 nm and 570 nm (referred to herein as "the second EMR 14" for the sake of brevity) that has a particular polarization orientation, such as a horizontal polarization orientation, and block the second EMR 14 that has any other polarization orientation. The second polarizing filter 22-2 may pass all other EMR 14 having wavelengths in a range between about 600 nm and 1000 nm irrespective of polarization orientation.

In another embodiment, the first EMR 14 waveband is in a range of about 700 nm to about 1000 nm, and the second EMR 14 waveband is in a range of about 1100 to about 2500 nm. In another embodiment, the first EMR 14 waveband is in a range of about 1100 nm to about 2500 nm, and the second EMR 14 waveband is in a near-infrared waveband in a range of about 3000 nm to about 4000 nm. In another embodiment, the first EMR 14 waveband is in a range of about 4000 nm to about 5000 nm, and the second EMR 14 waveband is in a range of about 8000 nm to about 14,000 nm.

The camera 12 receives partially polarized EMR 14 from the scene 16. The EMR 14 is partially polarized because it includes unpolarized EMR and polarized EMR after reflecting off or emitting from the area of the surface of the light within a field of view of the camera 12. The EMR 14 travels along the optical path 20 to the first polarizing filter 22-1, which passes to the second polarizing filter 22-1 a first subset of EMR 14 comprising EMR 14 in a first waveband that has a first polarization orientation and EMR 14 in one or more second wavebands irrespective of polarization orientation. The first polarizing filter 22-1 blocks the EMR 14 in the first waveband that does not have the first polarization orientation. As an example, the first polarizing filter 22-1 may pass red EMR 14 that has a particular polarization orientation, such as a vertical polarization orientation, and block red EMR 14 that has any other polarization orientation. The first polarizing filter 22-1 may pass all other EMR 14 having wavelengths in a range between about 300 nm and 500 nm irrespective of polarization orientation and EMR 14 having wavelengths in a range between about 800 nm and 1000 nm irrespective of polarization orientation.

The second polarizing filter 22-2 is configured to receive the first subset of the EMR 14 from the first polarizing filter 22-1 and passes a second subset of the EMR 14 including the EMR 14 in the second waveband that has a second polarization orientation and the EMR 14 in the first waveband that has the first polarization orientation. The second polarizing filter 22-2 blocks the EMR 14 in the second waveband that does not have the second polarization orientation. As an example, the second polarizing filter 22-2 may pass blue EMR 14 that has a particular polarization orientation, such as a horizontal polarization orientation, and block blue EMR 14 that has any other polarization orientation. The second polarizing filter 22-2 may pass all other EMR 14 having wavelengths in a range between about 500 nm and 1000 nm irrespective of polarization orientation (including the vertically polarized red EMR 14 passed by the first polarizing filter 22-1).

The sensor apparatus 26 receives the EMR 14 transmitted by the second polarizing filter 22-2, and outputs the sensor information 30 that quantifies the EMR 14 received by each detector element 28. In one embodiment a sensor information processing function 46 processes the sensor information 30 based on an amount of polarized EMR 14 received by each detector element 28 to generate processed sensor information 48. Such processing may visually distinguish disturbed earth areas from immediately adjacent earth areas via a visual characteristic, such as color, contrast, intensity, or the like. The sensor information processing function 46 is discussed in greater detail below. The display device 40 may then present an image 50 that is based on the processed sensor information 48, and that visually depicts disturbed areas of the earth that may be invisible or barely visible to the naked eye. In some embodiments, as illustrated in FIG. 1, the image 50 may include indicia, such as text and/or an outline about the disturbed earth area to more quickly draw a human eye to the disturbed earth area of the image 50.

Figure 2:
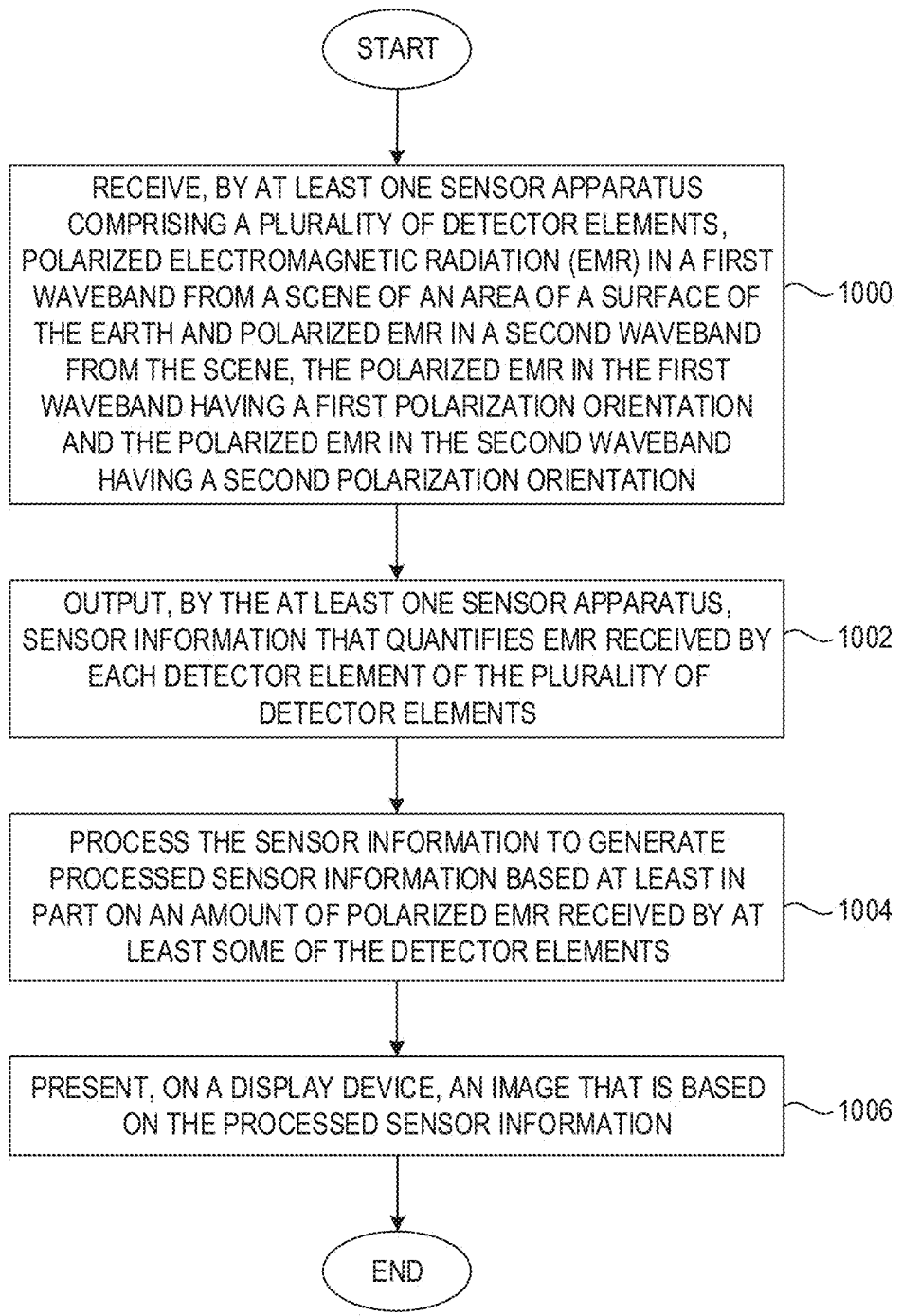
FIG. 2 is a flowchart of a method for polarization-based disturbed earth identification according to one embodiment.

FIG. 2 is a flowchart of a method for polarization-based disturbed earth identification according to one embodiment. FIG. 2 will be discussed in conjunction with FIG. 1. The sensor apparatus 26 receives the polarized EMR 14 in the first waveband from the scene 16 and the polarized EMR 14 in the second waveband from the scene 16. The polarized EMR 14 may be reflected and/or emitted from the scene 16. The EMR 14 in the first waveband has a first polarization orientation and the EMR 14 in the second waveband has a second polarization orientation (FIG. 2, block 1000). Note, as discussed above, the sensor apparatus 26 may also receive unpolarized EMR 14 in other wavebands. The sensor apparatus outputs the sensor information 30 that quantifies the EMR 14 received by each detector element 28 (FIG. 2, block 1002). The computing device 34 processes the sensor information 30 to generate the processed sensor information 48 based at least in part on an amount of polarized EMR 14 received by each detector element 28 (FIG. 2, block 1004). The computing device 34 presents the image 50 that is based on the processed sensor information 48 on the display device 40 (FIG. 2, block 1006).

Figure 3:
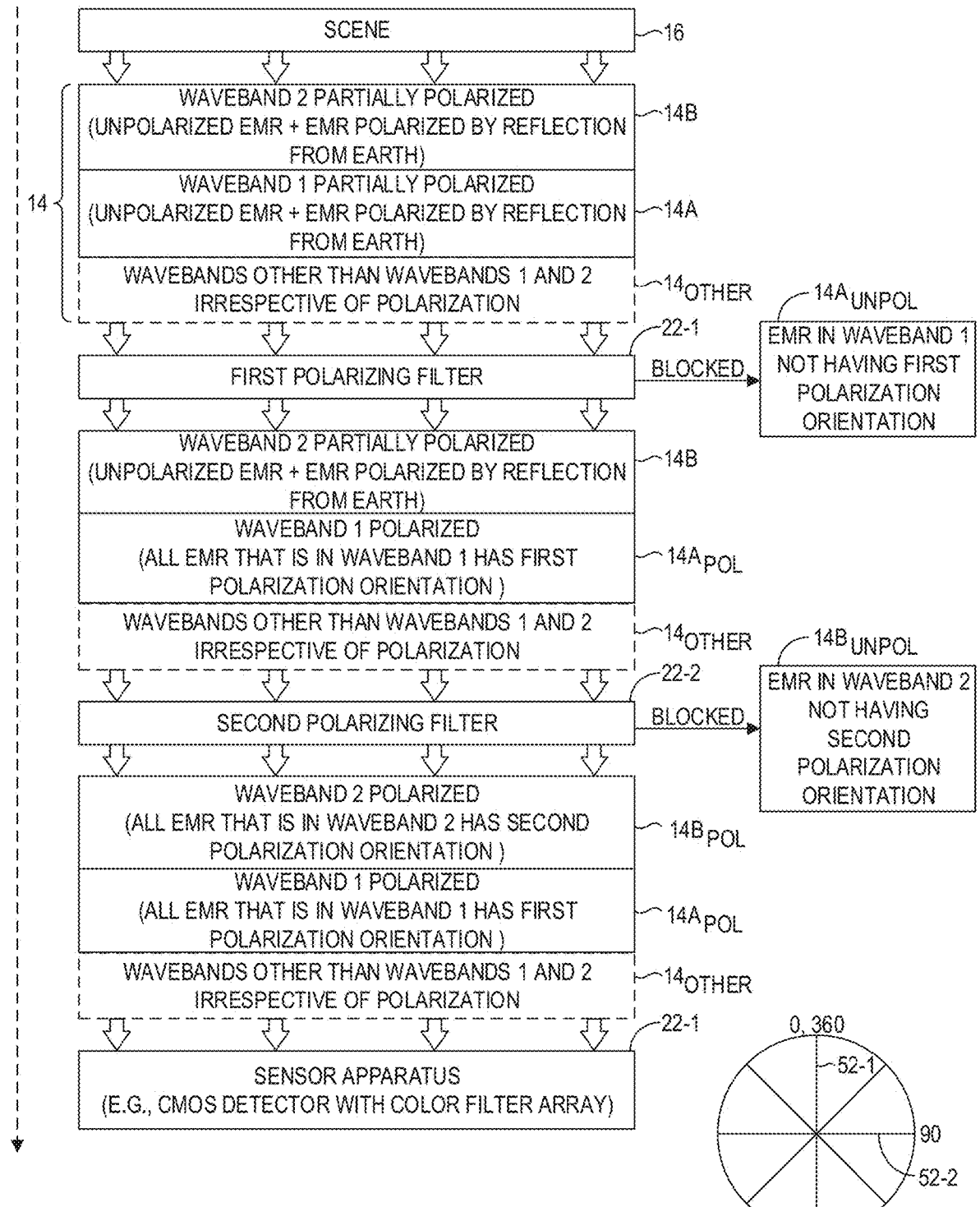
FIG. 3 is a block diagram illustrating filtering aspects of two polarizing filters according to one embodiment.

FIG. 3 is a block diagram illustrating filtering aspects of the two polarizing filters 22-1, 22-2 according to one embodiment. The EMR 14 will be described herein as partially polarized, meaning that some of the EMR 14 has been polarized by reflections or emissions off surfaces from the scene 16, and some of the EMR 14 is unpolarized. Merely for purposes of illustration, the first polarization orientation will be a zero degree orientation 52-1, and the second polarization orientation will be a ninety degree orientation 52-2. The EMR 14 includes EMR 14A that comprises the EMR 14 in the first waveband, both polarized and unpolarized, and EMR 14B that includes the EMR 14 in the second waveband, both polarized and unpolarized. The EMR 14 also includes EMR $14_{OTHER}$ in other wavebands irrespective of polarization.

The first polarizing filter 22-1 passes the EMR 14B and the EMR $14_{OTHER}$ downstream, and blocks the EMR $14A_{UNPOL}$ comprising the EMR 14 in the first waveband having any polarization orientation other than the first polarization orientation. The first polarizing filter 22-1 passes downstream the EMR $14A_{POL}$ comprising the EMR 14 in the first waveband having the first polarization orientation. The second polarizing filter 22-2 passes the EMR $14A_{POL}$ and the EMR $14_{OTHER}$ downstream, and blocks the EMR $14B_{UNPOL}$ comprising the EMR 14 in the second waveband having any polarization orientation other than the second polarization orientation. The second polarizing filter 22-2 passes downstream the EMR $14B_{POL}$ comprising the EMR 14 in the second waveband having the second polarization orientation. The EMR $14A_{POL}$, EMR $14B_{POL}$, and the EMR $14_{OTHER}$ in wavebands other than the first waveband and the second waveband are received by the sensor apparatus 26.

While for purposes of illustration the two polarization orientations 52-1, 52-2 have been described as vertical and horizontal, the embodiments are not limited to vertical polarization orientations and horizontal polarization orientations, and may comprise any two polarization orientations that differ from one another by sufficient angles, such as 45 degrees, 60 degrees, or 90 degrees. Additionally, polarization orientations may include circular or elliptical polarizations and may include any phase angle differences between the orthogonal components of the transverse electromagnetic fields.

Figure 4C:
FIGS. 4A-4D illustrate images of a disturbed earth area of a scene, according to one embodiment.
Figure 4D:
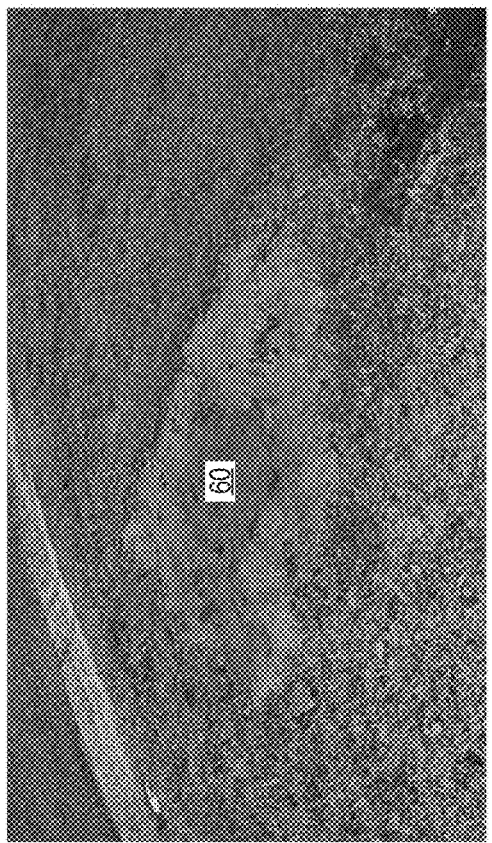
Figure 4A:
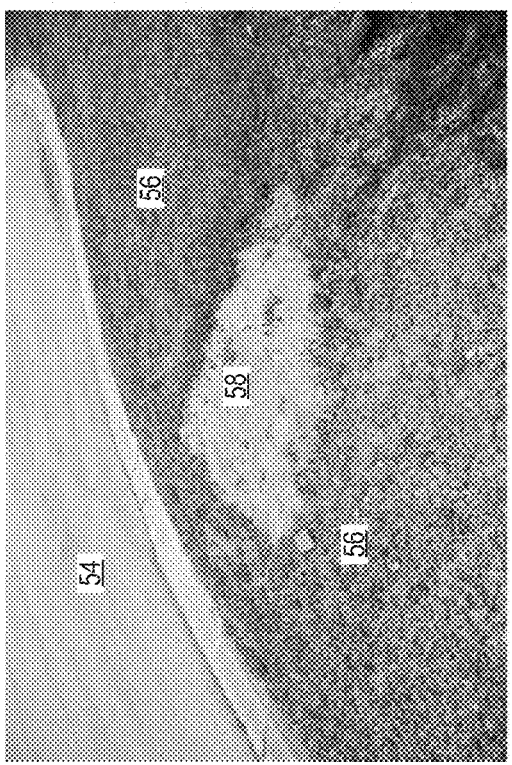
Figure 4B:
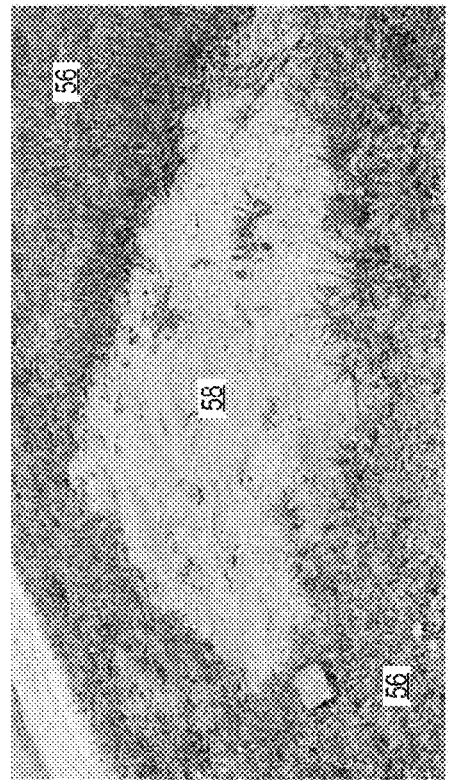

FIGS. 4A-4D illustrate images of a disturbed earth area of the scene 16, according to one embodiment. FIGS. 4A and 4B depict the scene 16 as seen by an unaided human eye. Note that the scene 16 includes a pavement area 54, a grass area 56, and a soil area 58. Within the soil area 58 is a disturbed earth area invisible, or practically invisible, to the unaided human eye. FIG. 4C illustrates the scene 16 using spectral analysis only, and without the use of the polarizing filters 22-1, 22-2. FIG. 4D illustrates the scene 16 in accordance with aspects of the present embodiments, including both spectral and polarization processing. FIG. 4D illustrates an image generated based on the system 10 illustrated in FIG. 1. FIG. 4D visually depicts a disturbed earth area 60 contained within the soil area 58.

FIGS. 5A-5D illustrate the same four images illustrated in FIGS. 4A-4D, with the disturbed earth area outlined.

Figure 6:
FIG. 6 is a diagram of an image illustrating a disturbed earth area on a display device according to one embodiment.

FIG. 6 illustrates the image 50 illustrating a disturbed earth area on the display device 40 according to one embodiment. In this embodiment the processor device 36 identifies, in the image 50, a sub-area of the area of the earth as a disturbed earth sub-area. In one embodiment, the processor device 36 identifies the sub-area of the area of the earth as the disturbed earth sub-area by determining a contrast difference in image pixels of the image 50, and based on the contrast difference between image pixels that depict the sub-area and surrounding image pixels adjacent to the image pixels that depict the sub-area, identifies the sub-area as the disturbed earth sub-area. In general, the mean and variance distributions of values which are highly different between disturbed and undisturbed indicate high separability.

Figure 7:
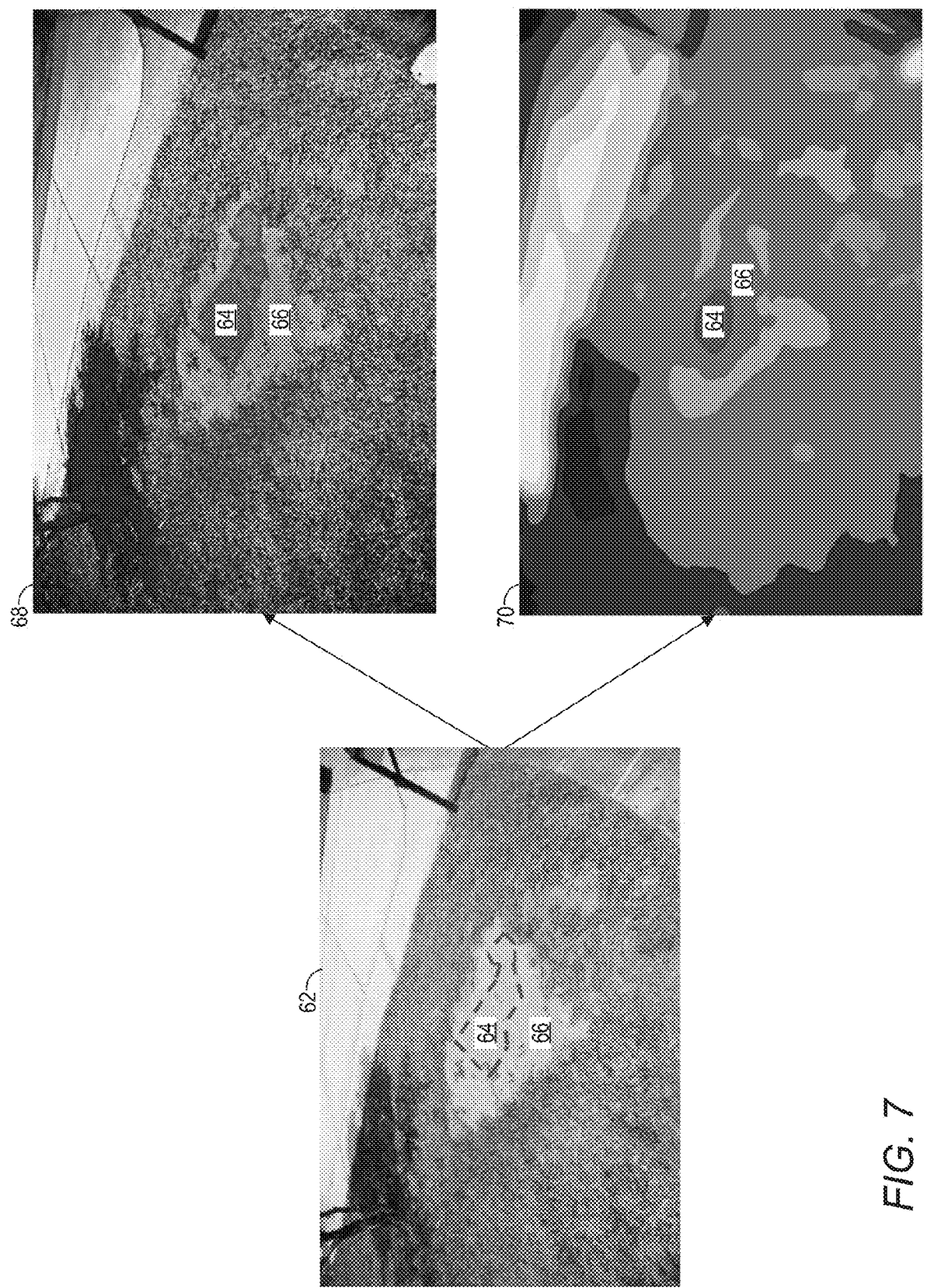
FIG. 7 illustrates additional examples of imagery that may be generated based on the embodiments disclosed herein.

FIG. 7 illustrates additional examples of imagery that may be generated based on the embodiments disclosed herein. In this example a scene 62 includes a disturbed earth area 64 in a soil area 66. The disturbed earth area 64 is visually indistinguishable from the surrounding soil area 66 to the naked eye. The system 10 processes the EMR 14 from the scene 62 in the manner discussed above with regard to FIG. 1 and generates the processed sensor information 48 based on an amount of polarized EMR 14 received by the detector elements 28. The processor device 36, in one embodiment, may generate an image 68 that visually distinguishes the disturbed earth area 64 from surrounding soil 66 via colorization.

In another embodiment, the processor device 36 may utilize one or more scene classification algorithms on the processed sensor information 48 to identify the disturbed soil from other scene backgrounds such as undisturbed soil, vegetation, rocks, debris, and other environment elements. The processor device 36 may then present, on the display device 40, a classification image 70 based on the processed sensor information 48. The classification image 70 may be presented with one or more tags identifying the different classified sub-areas, such as disturbed soil, undisturbed soil, vegetation, rocks, debris, and the like.

Figure 8:
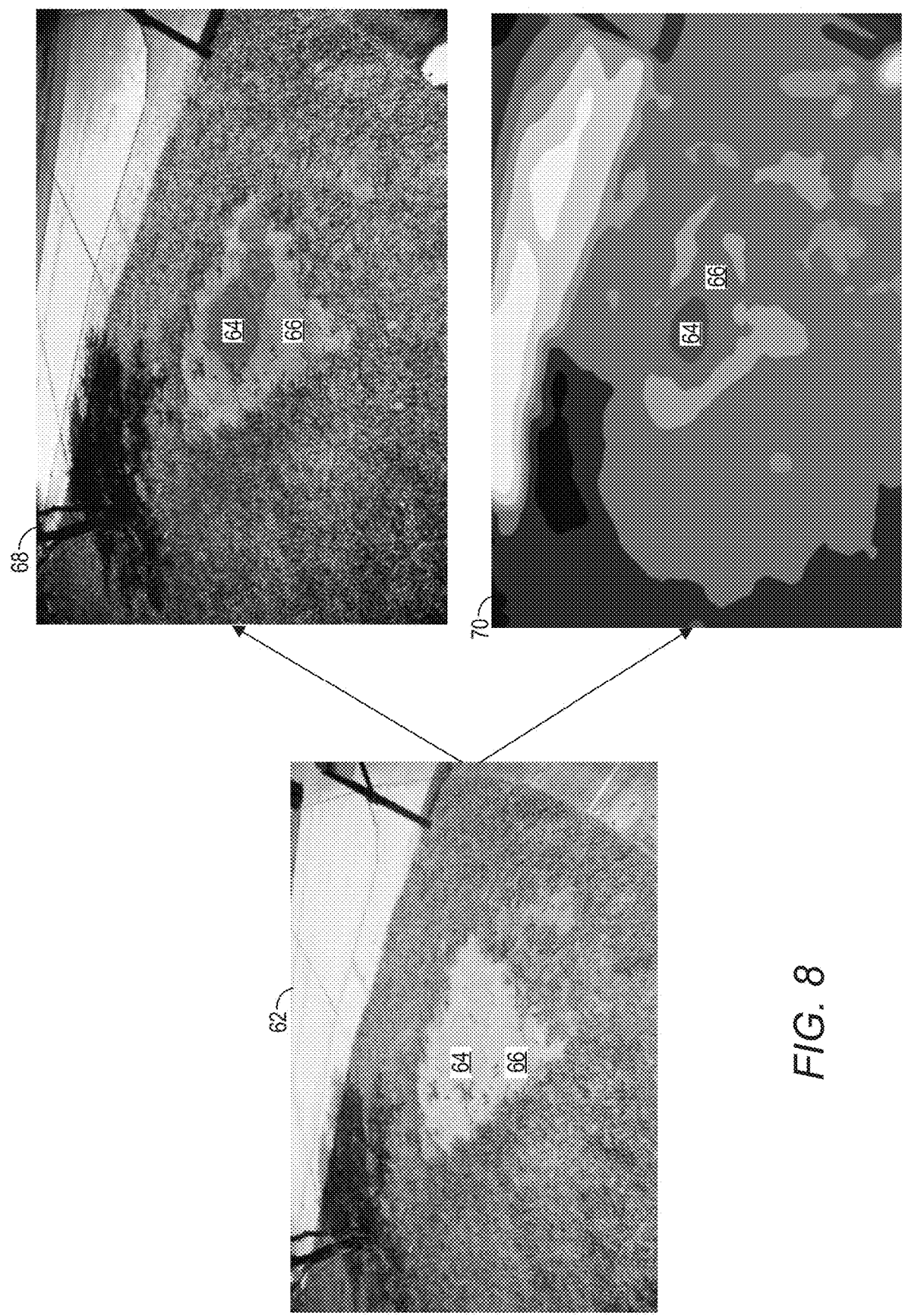
FIG. 8 is identical to FIG. 7 except in grayscale.

FIG. 8 is identical to FIG. 7 except in grayscale.

Figure 9:
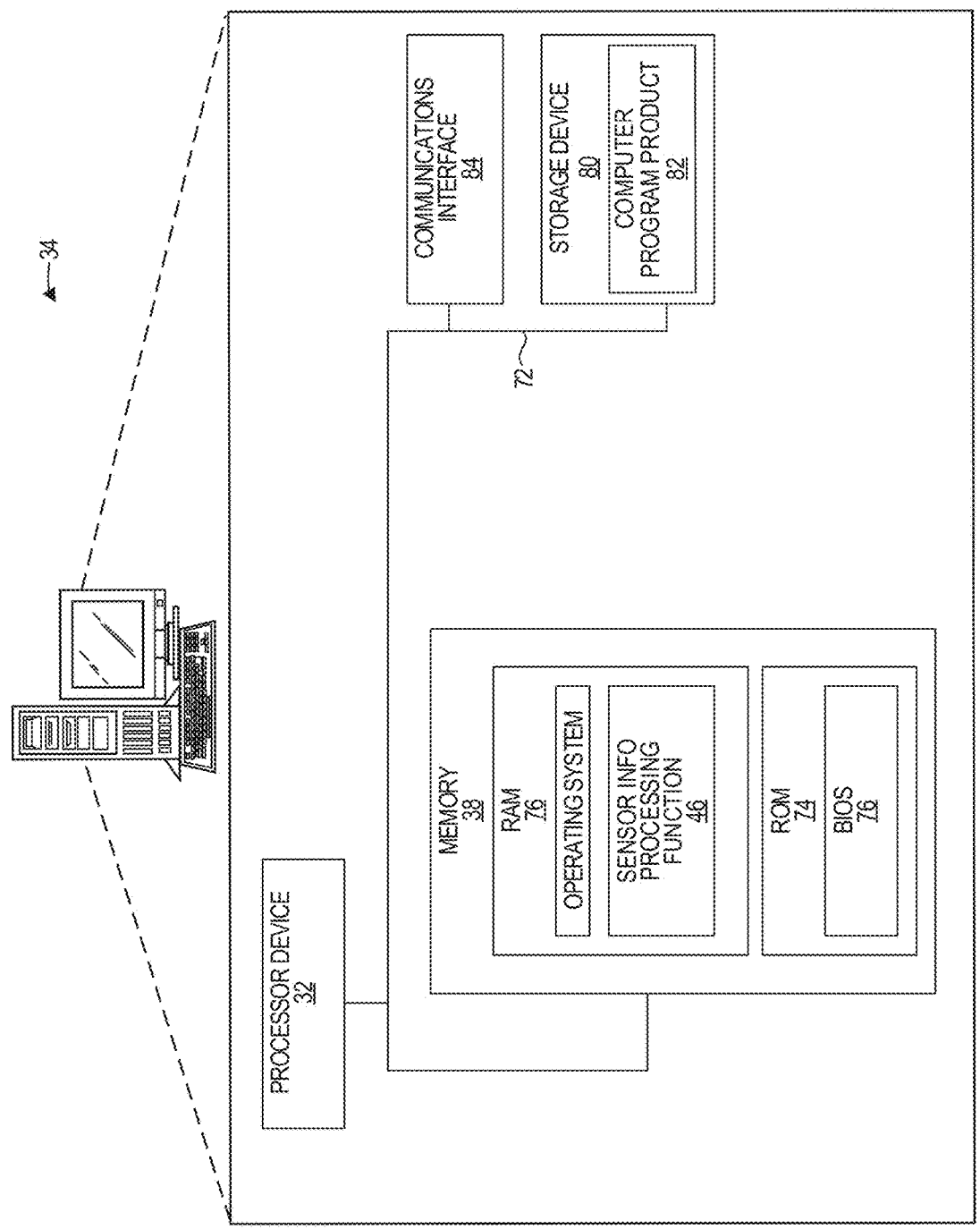
FIG. 9 is a block diagram of the computing device shown in FIG. 1 illustrated in additional detail, according to one embodiment.

FIG. 9 is a block diagram of the computing device 34 in additional detail, according to one embodiment. The computing device 34 may comprise any computing or electronic device capable of including firmware, hardware, and/or executing software instructions to implement the functionality described herein, such as a desktop computing device, a laptop computing device, a smartphone, a computing tablet, or the like. The computing device 34 includes the processor device 36, a memory 38, and a system bus 72. The system bus 72 provides an interface for system components including, but not limited to, the memory 38 and the processor device 36. The processor device 36 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The memory 38 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 75 may be stored in the non-volatile memory 74 and can include the basic routines that help to transfer information between elements within the computing device 34. The volatile memory 76 may also include a high-speed RAM, such as static RAM, for caching data.

The computing device 34 may further include or be coupled to a non-transitory computer-readable storage medium such as a storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 80 and in the volatile memory 76, including an operating system and one or more program modules, such as the sensor information processing function 46, which may implement the functionality described herein in whole or in part.

All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device 36 to carry out the steps described herein. Thus, the computer-readable program code can comprise software instructions for implementing the functionality of the examples described herein when executed on the processor device 36. The processor device 36, in conjunction with the program modules, may serve as a controller, or control system, for the computing device 34 that is to implement the functionality described herein. The computing device 34 may also include a communications interface 84 suitable for communicating with a network as appropriate or desired.

Mechanisms for processing the sensor information 30 to generate the processed sensor information 48 are discussed herein. In general, in some embodiments, the sensor information processing function 46 reduces the correlation in the levels of output channels of the sensor apparatus 26 (or in products of the channels) either as an autocorrelation or a cross-correlation within the channels data, yet produces a result with similar spatial context and optimally stretched channel data for maximum contrast of signals with little variance. Moreover, the sensor information processing function 46 may orthogonalize the channels data and produce the equivalent of a matched linear filter to reduce the autocorrelation of a signal as far as possible. In some embodiments, this is achieved by normalizing the power spectrum of the channels, and orthogonalizing their contributions in terms of their corresponding noise levels, sometimes referred to as noise whitening.

Orientation of the polarization axis can be set to either color (e.g., blue or red for example) at 0-degrees polarization orientation and the other at 90-degrees polarization orientation for optimal S1-type calculation across the entire spectrum. In some embodiments, with the sun facing the observation, the most blue polarizer set at 90-degrees will reduce the polarization reflection from undisturbed areas and transmit the diffuse scatter of the disturbed area in the most red 0-degree polarizer.

Summary of the System 10 According to Some Embodiments

A readout of the sensor information 30, such as the red, green, blue (RGB) values in the detector element information 32, corresponds to both the spectral and polarimetric levels of the scene (soil) radiance. Examples of the processing that the sensor information processing function 46 may implement to provide maximum contrast is given in two general methods, both of which can be optimized in calibration to a given spectral response of the sensor apparatus 26 and to the typical soil types expected. Generally, the phrase "contrast" is used to refer to statistical separation between the disturbed and undisturbed areas.

Simple processing may use the following steps:

1) Calibration of the sensor apparatus 26 to broad-band, unpolarized visible and near-infrared (VNIR) light sources, evenly illuminating on a flat diffusely reflecting surface (e.g., a calibration sphere or a Spectralon white board, for example).

2) Normalization of the response of the sensor apparatus 26 to provide uniform and unbiased (equal) response in the entire spectrum responsivity.

3) Calculation of the spectral S1 from scene (soil) radiance, with normalized channels, can be determined by the following formula:

$$S1 = ABS(90 \text{ degree channel} - 0 \text{ degree channel})$$

4) Further normalization can be done with the following formula:

$$S1/SUM(R,G,B \text{ channels})$$

5) Interpretation of the processed imagery will depend on the calibration, normalization and the soil type expected. Often the disturbed areas will appear either more red or more blue than the undisturbed areas, depending on choices of filter orientation and processing.

Extensive processing may include steps 1 and 2 discussed above, and may include the following inputs to a decorrelation processing (discussed below). The following combinations of inputs are some of the possibilities (not exclusive of others) of three-channel imagery using the following combinations:

1) Red, Green Blue with their respective visible and near infrared responses through the first polarizing filter 22-1 and the second polarizing filter 22-2.

2) Two color channels, plus the S1 computed in step 3 above.

3) S1, SUM(R,G,B) as computed in the steps above, and one color channel (trained a priori).

The three channel imagery combinations can be used in a decorrelation process, described below.

Decorrelation Stretching Matrix Calculation and Application

The algorithm uses large numbers of scene data values and context statistical calculations to separate spectral-polarimetric information, depending on the combination/selection of three channels described above. Most scene radiance will have a high background spectral-polarimetric overlap as well as spectral overlap/pollution in the sensor RGB filter transmissions. This is alleviated by decorrelation/orthogonalization in the following manner:

Selected 3-channel orthogonalization is done by finding the eigenfunctions of the three channels and transforming the data to the eigenspace (orthogonal space). The eigenspace is computed from the covariance of the scene pixels in each of the color channels. Using the sampled pixels, nine sums are needed to calculate the covariance matrix for the three channels. These sums are:

For l=1,3 (three channels); m=1,1, and sampling n pixels, $$SUMX_{l,m} = \sum_{k=1}^{n} P_{k,l}^* P_{k,m}$$

$$SUMX_l = \sum_{k=1}^{n} P_{k,l}$$

where Pk,l is the value of the kth pixel for Channel l. The covariance matrix is computed, using the following formulas:

$$Cov_{l,m} = \frac{1}{n-1}\left[SUMX_{l,m} - \frac{1}{n}*SUM_l*SUM_m\right]$$

The eigenvectors and eigenvalues of the system described by the covariance matrix are computed. The matrix of eigenvectors is referred to as the rotation matrix, R, in subsequent steps. The "stretching vector" (or normalization vector), s, is formed by taking the reciprocal of the square root of each element in the eigenvalue vector, and multiplying it by the desired standard deviation for the output image channels. For true normalization, the desired standard deviation would be one, but in order to yield output values in the appropriate range for eight bit pixels (i.e., byte data) a higher target value is used. The final transformation matrix, T, is composed from the rotation matrix and the stretching vector. This is done by the following matrix multiplication:

$T=R^\dagger sR$ wherein R is a matrix composed of the eigenvectors computed from the covariance matrix. s is the stretching vector, which is a vector of the eigenvalues from Cov(l,m). The matrix multiplication results in a transformation matrix, T, which is used on the original image to transform it into a contrast stretched image that emphasizes the target of interest.

Prior to doing the transformation upon the image, this transformation is applied to a vector of the means of the input channels. The result is used to compute the offsets needed to reposition the output image values to the 0 to 255 dynamic range of 8-bit data. For each pixel in the scene, the output pixel vector (3 valued) is computed by applying the final transformation matrix, and then the offset vector.

Figure 10:
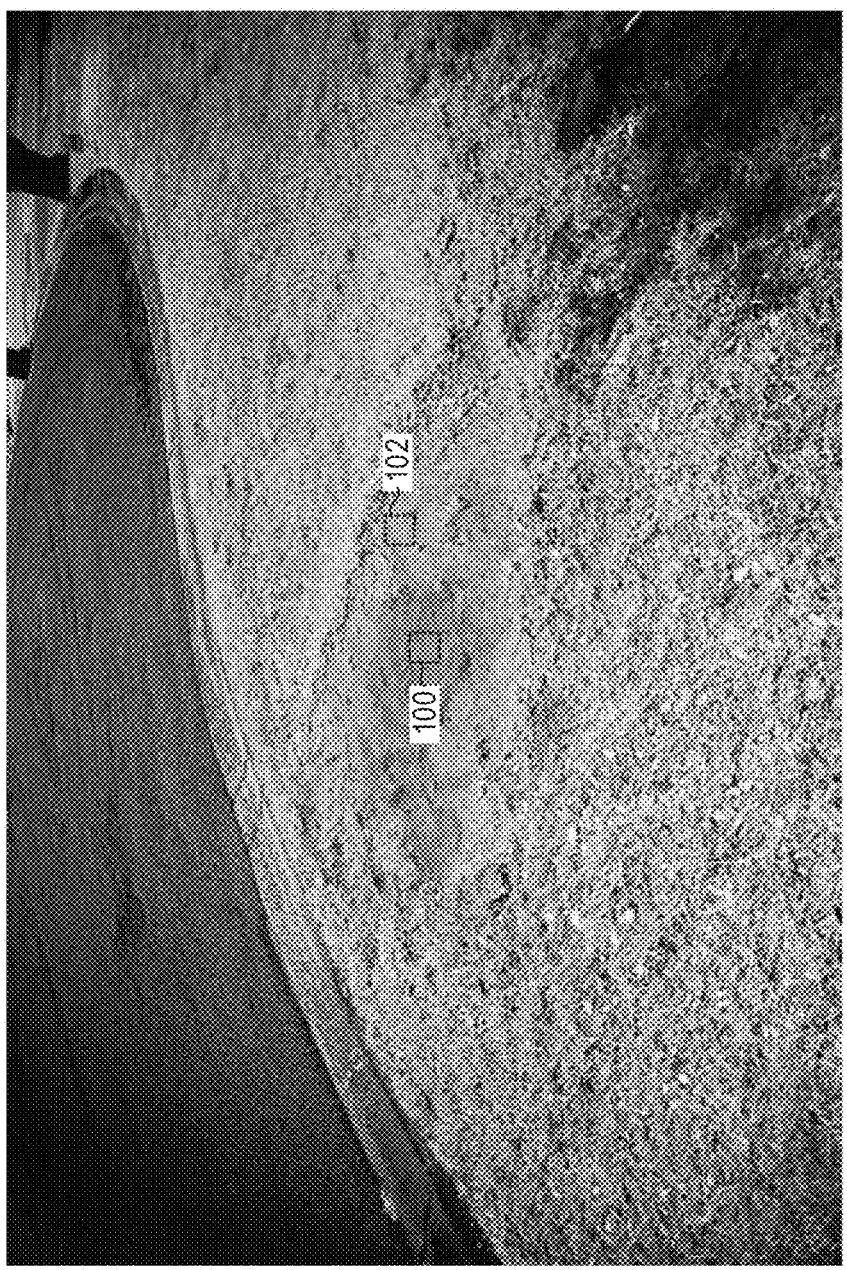
FIG. 10 illustrates an area of a disturbed earth portion of a scene from which electromagnetic radiation (EMR) was received by a first 64×64 detector element portion of a sensor apparatus, and an area of an undisturbed portion of the scene from which EMR was received by a second 64×64 detector element of the sensor apparatus.

FIG. 10 illustrates an area 100 of a disturbed earth portion of a scene 16 from which EMR was received by a first 64×64 detector element portion of a sensor apparatus, and an area 102 of an undisturbed portion of the scene from which EMR was received by a second 64×64 detector element of the sensor apparatus. Table 1 identifies computed means and standard deviations of grayscale sensor data associated with the areas 100 and 102 using three different images, a visible image (e.g., FIG. 5A), a spectral only image (e.g., FIG. 5C), and a spectral-polarimetric image utilizing the polarization-based mechanisms disclosed herein (e.g., FIG. 5D).

TABLE 1

| AREA | MEAN | STD. DEVIATION |
|---|---|---|
| Visible Undisturbed (area 102) | 219.5962 | 25.5328 |
| Visible Disturbed (area 100) | 217.6638 | 13.6955 |
| Spectral Undisturbed (area 102) | 142.6045 | 31.3900 |
| Spectral Disturbed (area 100) | 174.5908 | 20.1813 |
| Spectral-Polarimetric Und. (area 102) | 156.0469 | 43.2468 |
| Spectral-Polarimetric Dis. (area 100) | 85.3577 | 24.5746 |

Figure 5A:
FIGS. 5A-5D illustrate the same four images illustrated in FIGS. 4A-4D, with the disturbed earth area outlined.
Figure 5B:
Figure 5C:
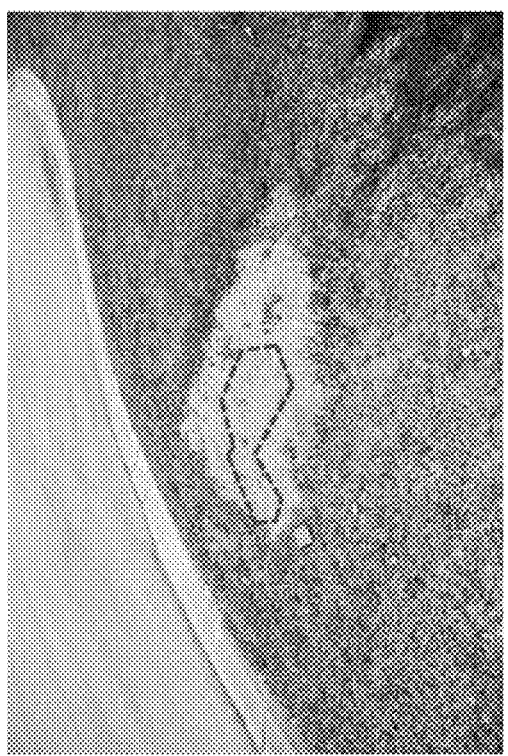
Figure 5D:
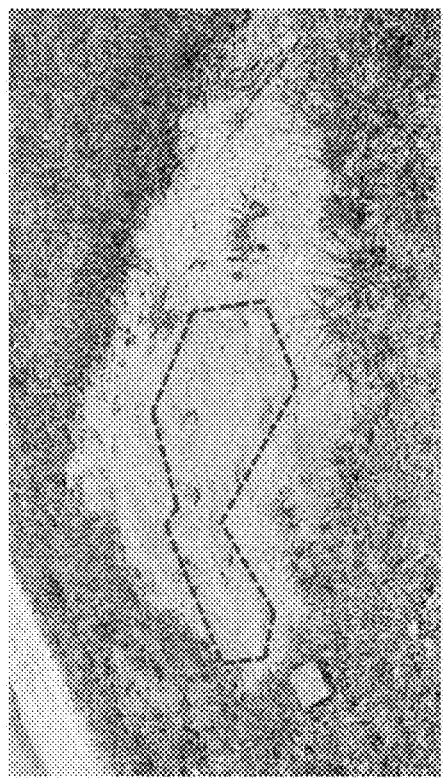
Figure 11:
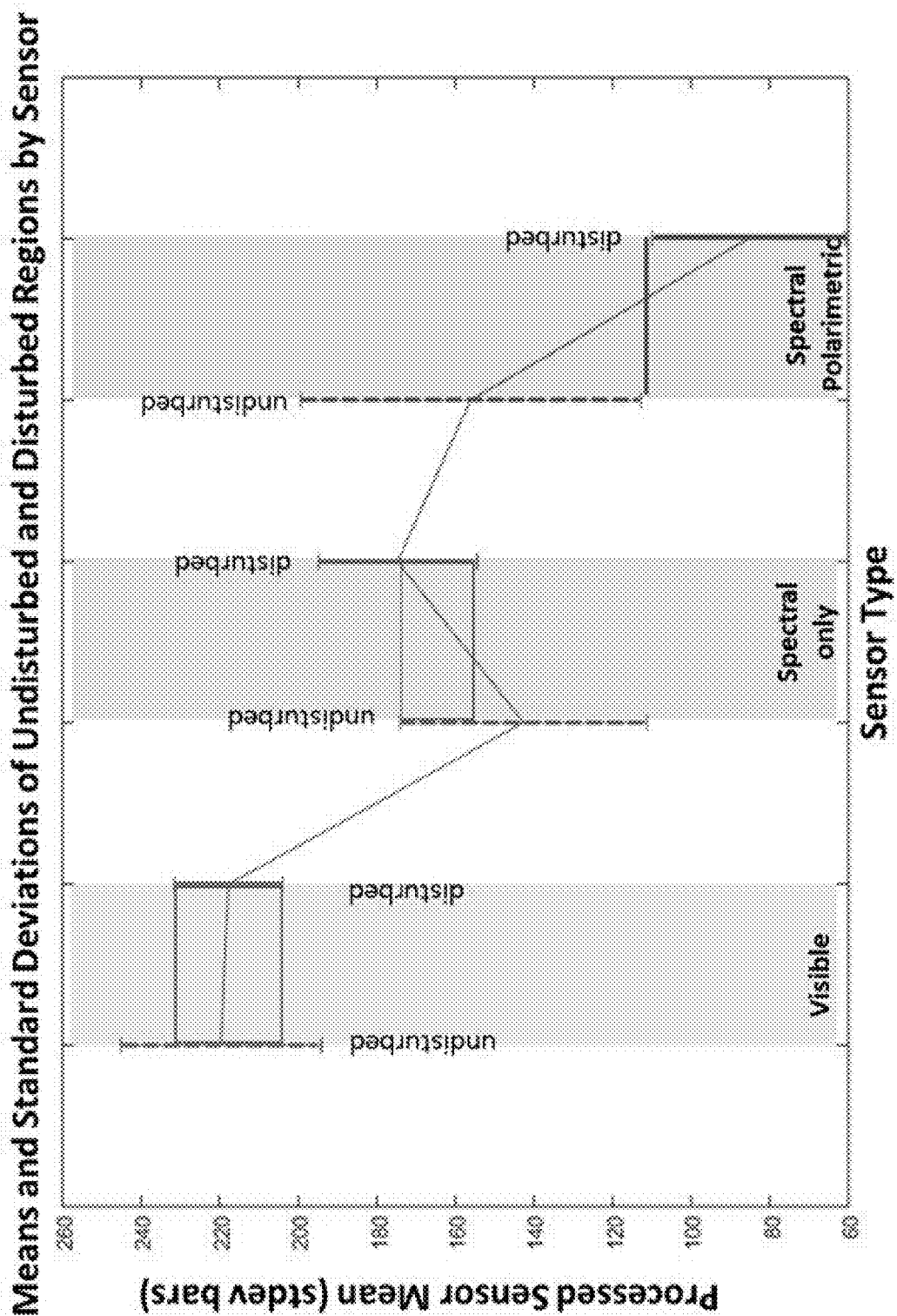
FIG. 11 illustrates a graph based on the data derived from each of three different images of the scene illustrated in FIG. 10, a visible image, a spectral only image, and a spectral-polarimetric image utilizing the polarization-based mechanisms disclosed herein.

FIG. 11 illustrates a graph based on the data from Table 1, for each of three different images (referred to as "sensor type" in FIG. 11): a visible image (e.g., FIG. 5A), a spectral only image (e.g., FIG. 5C), and a spectral-polarimetric image utilizing the polarization-based mechanisms disclosed herein (e.g., FIG. 5D). Along the Y-axis are means and error bars associated with standard deviations. On the left side of each image type (i.e., sensor type) is plotted the undisturbed area statistics. On the right side of each image type (i.e., sensor type) is plotted the disturbed area statistics. A box bridging between the overlapping variance/deviations between the disturbed area 100 and the undisturbed area 102 is drawn to show the significance of separability in each image type (i.e., sensor type). The more similar the means and the higher the variance overlap, the more difficult to separate the disturbed area 100 from the undisturbed area 102.

The statistical overlap of the variance (standard deviation) between disturbed earth portions and undisturbed portions is highest in the visible image, lower in the spectral-only image, and nearly zero in the spectral-polarimetric image. The clean distinction in statistics of the spectral-polarimetric data indicates high separation of the two classes of soil.

Figure 12:
FIG. 12 illustrates an area of a disturbed earth portion of the scenes illustrated in FIG. 7 from which EMR was received by a first 64×64 detector element portion of a sensor apparatus, and an area of an undisturbed portion of the scenes illustrated in FIG. 7 from which EMR was received by a second 64×64 detector element of the sensor apparatus.

FIG. 12 illustrates an area 104 of a disturbed earth portion of the scenes 62, 68 illustrated in FIG. 7 from which EMR was received by a first 64×64 detector element portion of a sensor apparatus, and an area 106 of an undisturbed portion of the scenes 62, 68 from which EMR was received by a second 64×64 detector element of the sensor apparatus. Table 2 identifies computed means and standard deviations associated with the areas 104 and 106 using two different images, a visible image (scene 62) and a spectral-polarimetric image (scene 68) utilizing the polarization-based mechanisms disclosed herein.

TABLE 2

| AREA | MEAN | STD DEVIATION |
|---|---|---|
| Visible Undisturbed (area 106) | 209.3135 | 12.0476 |
| Visible Disturbed (area 104) | 206.8928 | 3.8739 |
| Spectral-Polarimetric Und. (area 106) | 208.2217 | 8.6739 |
| Spectral-Polarimetric Dis. (area 104) | 193.8867 | 4.4354 |

Figure 13:
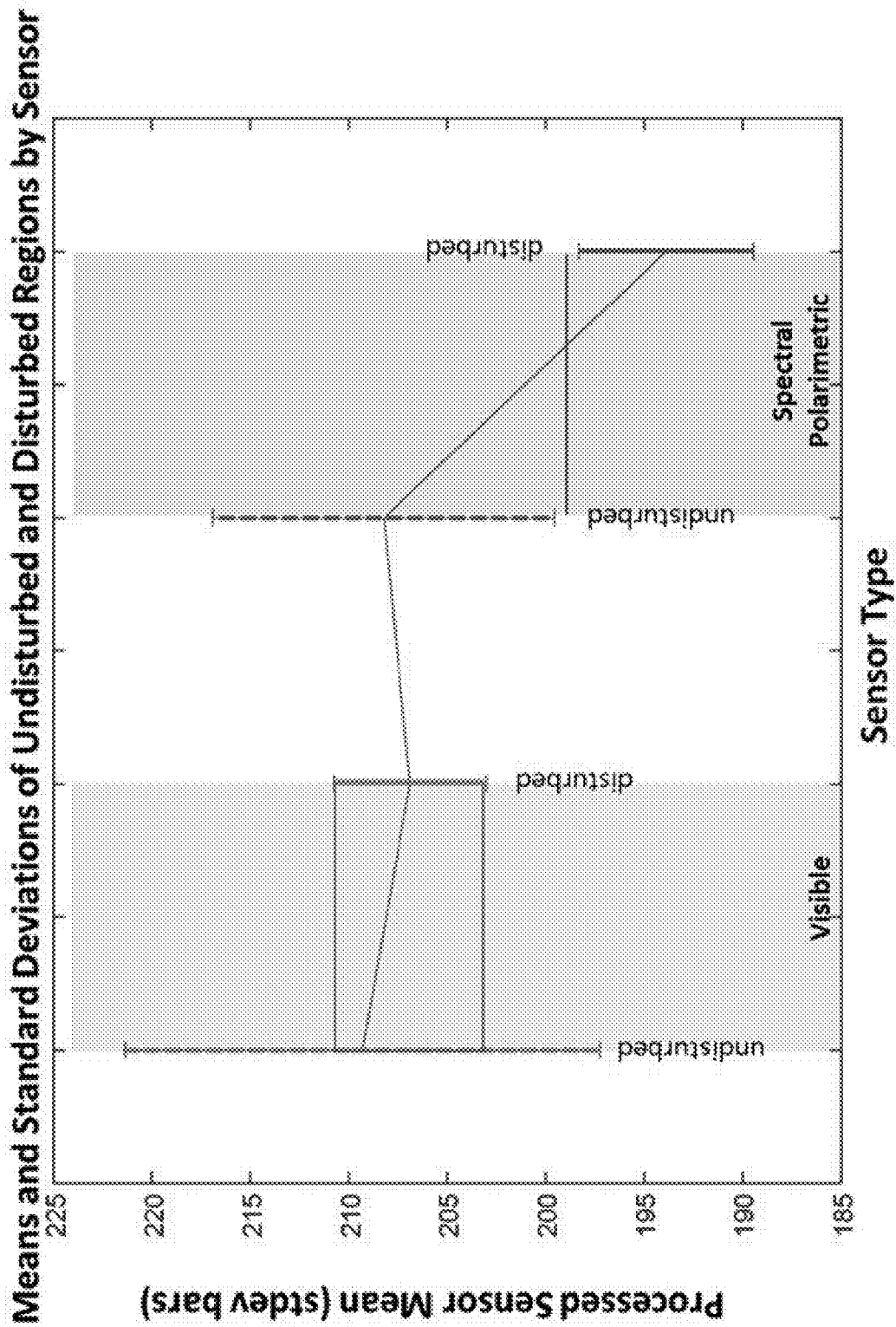
FIG. 13 illustrates a graph based on data from each of two different images of the scene illustrated in FIG. 12, a visible image, and a spectral-polarimetric image utilizing the polarization-based mechanisms disclosed herein.

FIG. 13 illustrates a graph based on the data from Table 2, for each of the two different images (referred to as "sensor type" in FIG. 13), a visible image (e.g., scene 62), and a spectral-polarimetric image (scene 68) utilizing the polarization-based mechanisms disclosed herein. Along the Y-axis are means and error bars associated with standard deviations. On the left side of each image type (i.e., sensor type) is plotted the undisturbed area statistics. On the right side of each image type (i.e., sensor type) is plotted the disturbed area statistics. A box bridging between the overlapping variance/deviations between the disturbed area 104 and the undisturbed area 106 is drawn to show the significance of separability in each image type (i.e., sensor type).

The statistical overlap of the variance (std-dev) between disturbed and undisturbed is highest in the visible, and zero in the spectral-polarimetric. The clean distinction in statistics of the spectral-polarimetric data indicates high separation of the two classes of soil.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by at least one sensor apparatus comprising a plurality of detector elements, polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation;
   outputting, by the at least one sensor apparatus, sensor information that quantifies EMR received by each detector element of the plurality of detector elements, wherein the sensor information comprises, for each detector element, detector element information that quantifies the amount of EMR received by a corresponding detector element;
   processing, by a computing device, the sensor information to generate processed sensor information based at least in part on an amount of polarized EMR received by at least some of the detector elements, wherein the processed sensor information comprises updated detector element information, and wherein processing the sensor information to generate the processed sensor information comprises:
      generating intensity values for at least some of the updated detector element information based on an amount of polarized EMR received by corresponding detector elements to visually distinguish detector elements that received the polarized EMR in the first waveband having the first polarization orientation from the detector elements that received the polarized EMR in the second waveband having the second polarization orientation; and
   presenting, on a display device, an image that is based on the processed sensor information.

2. The method of claim 1 wherein the detector element information comprises a green channel value that quantifies green EMR received by the respective detector element, a red channel value that quantifies red EMR received by the respective detector element, and a blue channel value that quantifies blue EMR received by the respective detector element.

3. The method of claim 2 wherein determining, for each detector element, the amount of polarized EMR received by the detector element comprises determining, for each detector element, a Stokes 51 parameter based on the polarized EMR in the first waveband having the first polarization orientation and the polarized EMR in the second waveband having the second polarization orientation that impinged on the detector element.

4. The method of claim 1 further comprising:
   identifying, in the image, a sub-area of the area of the surface of the earth as a disturbed earth sub-area.

5. The method of claim 4 wherein identifying the sub-area of the area of the surface of the earth as the disturbed earth sub-area comprises:
   determining a contrast difference in image pixels of the image; and
   based on the contrast difference between image pixels that depict the sub-area of the area of the surface of the earth and surrounding image pixels adjacent to the image pixels that depict the sub-area of the area of the surface of the earth, identifying the sub-area of the area of the surface of the earth as the disturbed earth sub-area.

6. The method of claim 1 wherein the first polarization orientation is a first linear polarization orientation and the second polarization orientation is a second linear polarization orientation that is orthogonal to the first linear polarization orientation.

7. The method of claim 1 wherein the first polarization orientation is a first circular polarization orientation and the second polarization orientation is a second circular polarization orientation that is different from the first circular polarization orientation.

8. The method of claim 1 wherein the first waveband is in a range of about 550 nm to about 750 nm, and the second waveband is in a range of about 300 nm to about 500 nm.

9. The method of claim 1 wherein the first waveband is in a range of about 370 nm to about 570 nm, and the second waveband is in a near-infrared waveband in a range of about 650 nm to about 1000 nm.

10. The method of claim 1 wherein the first waveband is in a range of about 550 nm to about 750 nm, and the second waveband is in a range of about 370 nm to about 570 nm.

11. The method of claim 1 wherein the image of the scene is a classification image, further comprising generating the classification image using a scene classification algorithm.

12. The method of claim 11 wherein generating the classification image using the scene classification algorithm further comprises generating the classification image using the scene classification algorithm to identify at least one sub-area of the image as a disturbed earth sub-area.

13. The method of claim 1 wherein the first waveband is in a range of about 700 nm to about 1000 nm, and the second waveband is in a range of about 1100 nm to about 2500 nm.

14. The method of claim 1 wherein the first waveband is in a range of about 1100 nm to about 2500 nm, and the second waveband is in a near-infrared waveband in a range of about 3000 nm to about 4000 nm.

15. The method of claim 1 wherein the first waveband is in a range of about 4000 to about 5000 nm, and the second waveband is in a range of about 8000 nm to about 14000 nm.

16. A system comprising:
   at least one sensor apparatus configured to:
      receive, by the at least one sensor apparatus, polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation; and
      output sensor information that quantifies EMR received by each detector element of the plurality of detector elements, wherein the sensor information comprises, for each detector element, detector element information that quantifies the amount of EMR received by a corresponding detector element; and a processor device communicatively coupled to the at least one sensor apparatus, the processor device configured to:
process the sensor information to generate processed sensor information based at least in part on an amount of polarized EMR received by at least some of the detector elements, wherein the processed sensor information comprises updated detector element information, and wherein to process the sensor information to generate the processed sensor information, the processor device is further configured to:
generate intensity values for at least some of the updated detector element information based on an amount of polarized EMR received by corresponding detector elements to visually distinguish detector elements that received the polarized EMR in the first waveband having the first polarization orientation from the detector elements that received the polarized EMR in the second waveband having the second polarization orientation; and
present, on a display device, an image that is based on the processed sensor information.

17. The system of claim 16 further comprising:
a first polarizing filter configured to:
receive EMR from the scene;
filter the EMR to block EMR in the first waveband that does not have the first polarization orientation and to pass the polarized EMR in the first waveband having the first polarization orientation; and
pass EMR in the second waveband irrespective of polarization orientation; and
a second polarizing filter configured to:
receive the polarized EMR in the first waveband and the EMR in the second waveband;
filter the EMR in the second waveband to block EMR in the second waveband that does not have the second polarization orientation and to pass the polarized EMR in the second waveband having the second polarization orientation; and
pass the polarized EMR in the first waveband having the first polarization orientation toward the at least one sensor apparatus.

18. The system of claim 16 wherein the processor device is further configured to identify, in the image, a sub-area of the area of the surface of the earth as a disturbed earth sub-area.

19. The system of claim 16 wherein the first polarization orientation is a first linear polarization orientation and the second polarization orientation is a second linear polarization orientation that is orthogonal to the first linear polarization orientation.

20. A computer program product stored on a non-transitory computer-readable storage medium and including instructions configured to cause a processor device to:
receive sensor information from at least one sensor apparatus, the sensor apparatus receiving polarized electromagnetic radiation (EMR) in a first waveband from a scene of an area of a surface of the earth and polarized EMR in a second waveband from the scene, the polarized EMR in the first waveband having a first polarization orientation and the polarized EMR in the second waveband having a second polarization orientation, the sensor information quantifying EMR received by each detector element of a plurality of detector elements;
process the sensor information to generate processed sensor information based at least in part on an amount of polarized EMR received by at least some of the detector elements;
present, on a display device, an image that is based on the processed sensor information; and
identify, in the image, a sub-area of the area of the surface of the earth as a disturbed earth sub-area, and wherein to identify the sub-area of the area of the surface of the earth as the disturbed earth sub-area, the instructions are configured to cause the processor device to:
determine a contrast difference in image pixels of the image; and
based on the contrast difference between image pixels that depict the sub-area of the area of the surface of the earth and surrounding image pixels adjacent to the image pixels that depict the sub-area of the area of the surface of the earth, identify the sub-area of the area of the surface of the earth as the disturbed earth sub-area.

21. A system comprising:
at least one sensor apparatus;
a first polarizing filter configured to:
receive EMR from a scene of an area of a surface of the earth;
filter the EMR to block EMR in a first waveband that does not have a first polarization orientation and to pass polarized EMR in the first waveband having the first polarization orientation; and
pass EMR in a second waveband irrespective of polarization orientation; and
a second polarizing filter configured to:
receive the polarized EMR in the first waveband and the EMR in the second waveband;
filter the EMR in the second waveband to block EMR in the second waveband that does not have the second polarization orientation and to pass the polarized EMR in the second waveband having the second polarization orientation; and
pass the polarized EMR in the first waveband having the first polarization orientation toward the at least one sensor apparatus;
wherein the at least one sensor apparatus is configured to:
receive polarized EMR in the first waveband from the scene and polarized EMR in the second waveband from the scene, the polarized EMR in the first waveband having a first polarization orientation and the polarized EMR in the second waveband having a second polarization orientation; and
output sensor information that quantifies EMR received by each detector element of the plurality of detector elements; and
a processor device communicatively coupled to the at least one sensor apparatus, the processor device configured to:
process the sensor information to generate processed sensor information based at least in part on an amount of polarized EMR received by at least some of the detector elements; and
present, on a display device, an image that is based on the processed sensor information.

* * * * *